United States Patent [19]

Takekoshi et al.

[11] Patent Number: 4,639,627

[45] Date of Patent: Jan. 27, 1987

[54] INTERLOCKING YOKE AND ENDPLATES FOR PERMANENT MAGNET ROTOR

[75] Inventors: Yoshitaka Takekoshi, Hachioji; Shigeyuki Ushiyama, Hino, both of Japan

[73] Assignee: Fanuc Ltd., Yamanashi, Japan

[21] Appl. No.: 691,299

[22] PCT Filed: Apr. 19, 1984

[86] PCT No.: PCT/JP84/00199

§ 371 Date: Dec. 20, 1984

§ 102(e) Date: Dec. 20, 1984

[87] PCT Pub. No.: WO84/04430

PCT Pub. Date: Nov. 8, 1984

[30] Foreign Application Priority Data

Apr. 20, 1983 [JP] Japan ............................ 58-68338

[51] Int. Cl.[4] .............................................. H02K 21/12
[52] U.S. Cl. ....................................... 310/156; 310/261
[58] Field of Search .................. 310/42, 152, 216, 218, 310/261, 264, 156

[56] References Cited

U.S. PATENT DOCUMENTS

| | | | |
|---|---|---|---|
| 826,650 | 7/1906 | Christensen | 310/218 |
| 2,655,611 | 10/1953 | Sherman | 310/156 |
| 2,719,931 | 10/1955 | Kober | 310/156 |
| 3,422,294 | 1/1969 | Parker | 310/42 |
| 3,427,486 | 2/1969 | Whitney | 310/261 |
| 4,337,405 | 6/1982 | Hishida | 310/90 |
| 4,513,216 | 4/1985 | Müller | 310/156 |
| 4,543,506 | 9/1985 | Kawada et al. | 310/156 |

Primary Examiner—Mark O. Budd
Assistant Examiner—D. L. Rebsch
Attorney, Agent or Firm—Armstrong, Nikaido, Marmelstein & Kubovcik

[57] ABSTRACT

A permanent-magnet field rotor (20) for use in a synchronous motor such as an AC servo motor comprises a shaft (21), a pair of end plates (22, 23) fixed on the shaft (21) and axially spaced from each other, a plurality of permanent magnets (24) extending outwardly in the radial direction of the shaft (21) and axially extending between the end plates (22, 23), and a plurality of yokes (25) disposed between successive permanent magnets (24) and axially extending between the end plates (22, 23) to hold the permanent magnets (24). Each of said yokes (25) has an axial protrusion (34, 35) at either end thereof, and the end plates (22, 23) have provided therein engagement holes (26, 37) which serve, when engaged on the axial protrusions (34, 35) to prevent the yokes from moving circumferentially and radially.

5 Claims, 9 Drawing Figures

INTERLOCKING YOKE AND ENDPLATES FOR PERMANENT MAGNET ROTOR

DESCRIPTION

1. Technical Field

The present invention relates to a permanent-magnet field rotor for use in a synchronous motor such as AC servo motor, etc.

2. Background Art

Generally, the permanent-magnet field rotor used in synchronous motor, e.g., AC servo motor, comprises a shaft, a plurality of yokes to form magnetic paths, these being radially disposed on the outer circumference of the shaft, a plurality of permanent magnets each held between two successive yokes, and a pair of end plates fixed to the shaft to support each yoke at the opposite ends thereof.

In the conventional rotors of this kind, the pair of end plates and each yoke engage each other on a plane perpendicular to the shaft axis; therefore, a bonding agent, welding or similar technique must be used to fix the yokes and end plates, and tie bolts and nuts are used to rigidly couple each yoke with the end plates. However, the adhesion of the bonding agent used for the above purpose becomes degraded due to the heat and centrifugal force of the rotor. Welding causes deformation of the yokes and end plates and also complicates the manufacturing process. Also the use of the tie bolts and nuts adds to the number of parts of the rotor.

DISCLOSURE OF THE INVENTION

An object of the present invention is to overcome the above-mentioned drawbacks of the prior art by providing a permanent-magnet field rotor in which yokes and end plates can be rigidly coupled together without adding to the number of parts and which can be simply assembled.

The above object is accomplished by a permanent-magnet field rotor, according to the present invention, comprising a shaft, a pair of end plates fixed to the shaft, which are axially spaced from each other, a plurality of permanent magnets each extending outwardly in the radial direction of the shaft and also axially between the end plates, and a plurality of yokes disposed between successive permanent magnets to hold the permanent magnets, each of which extends axially between the end plates, each of the yokes being provided with a protrusion at either end thereof and each of the end plates being provided with an engagement hole therein which serves, when engaged on the protrusion, to prevent the yoke from moving circumferentially and radially.

According to the another aspect of the present invention, the shaft should preferably be provided with an axially extending keyway in the outer cylindrical surface thereof, and each of the pair of end plates has an inner cylindrical face fittable to the shaft and a protrusion projecting inwardly from the inner cylindrical face in the radial direction which engages in the keyway in the shaft, thereby securely preventing the pair of end plates from rotating about the shaft.

According to a yet another aspect of the present invention, the yoke should preferably be provided at either circumferential corner thereof with a protruding edge for preventing the permanent magnet from moving in the radial direction of the shaft.

The foregoing and other objects and advantages of the present invention will be better understood from the ensuing description made by way of example with reference to the accompanying drawings.

BEST MODE FOR CARRYING OUT THE INVENTION

Figure 1:
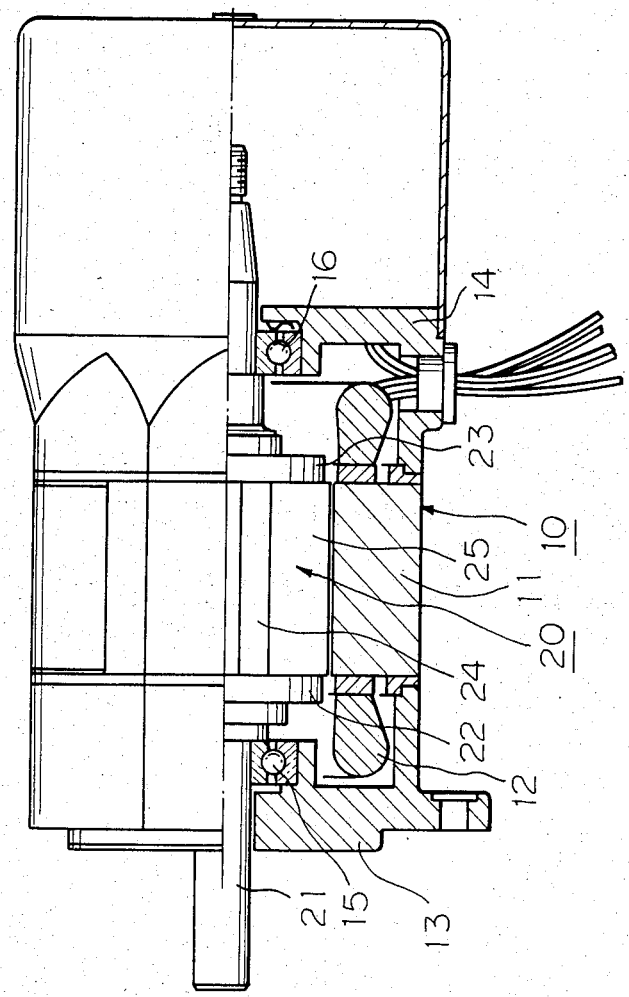
FIG. 1 is a half longitudinal sectional side elevation of an AC servo motor in which the permanent-magnet field rotor according to the present invention is adopted.

FIG. 1 shows an AC servo motor employing one embodiment of the permanent-magnet field rotor according to the present invention, and FIGS. 2 through 8 show the construction of the rotor. Referring now to FIG. 1, the AC servo motor comprises a stator 10 which comprises a stator core 11 extending axially, a winding 12 provided on the stator core 11, and a pair of brackets 13 and 14 fixed to the opposite ends of the stator core 11. The AC servo motor further comprises a rotor 20 having a shaft 21 which is rotatably supported in the brackets 13 and 14 by means of bearings 15 and 16. The shaft can be coupled at one end thereof with a driven unit (not shown) and at the other end with a rotary encoder (not shown), for example.

Figure 3:
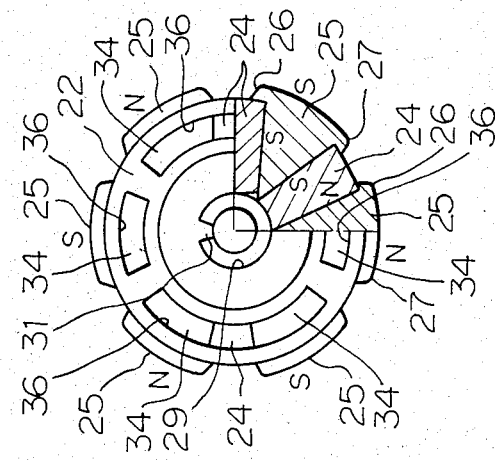
FIG. 3 is a partially sectional end view of the rotor shown in FIG. 1.
Figure 2:
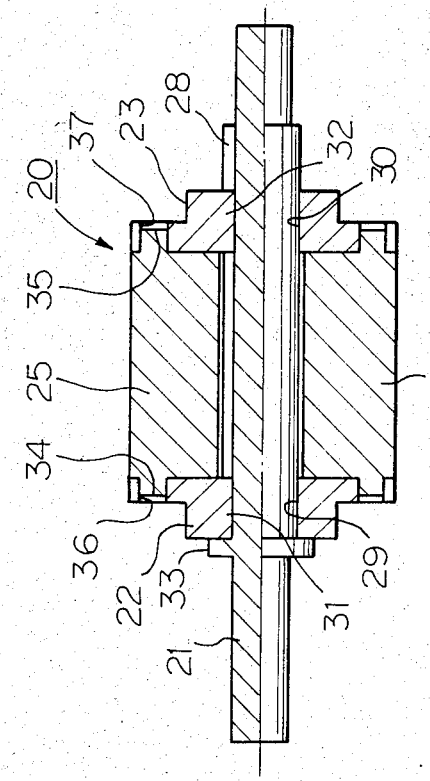
FIG. 2 is a longitudinal sectional view of the rotor shown in FIG. 1.
Figure 4:
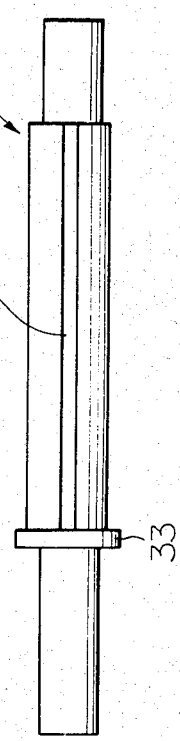
FIG. 4 is a plan view of the rotor shaft shown in FIG. 1.
Figure 5:
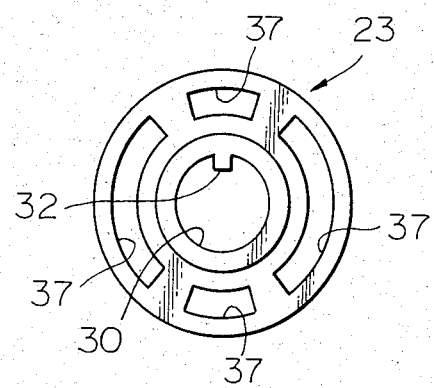
FIG. 5 is an end view of the rotor end plate shown in FIG. 1.
Figure 6:
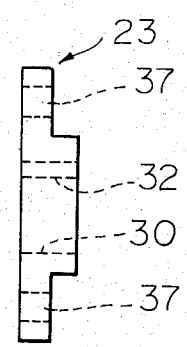
FIG. 6 is a side elevation of the rotor end plate shown in FIG. 5.
Figure 7:
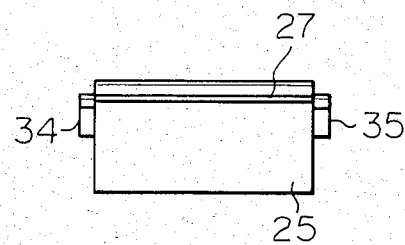
FIG. 7 is a side elevation of the rotor yoke shown in FIG. 1.
Figure 8:
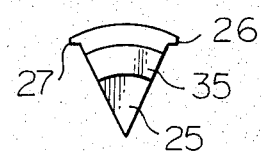
FIG. 8 is an end view of the yoke shown in FIG. 7.

Referring here to FIGS. 2 and 3, a pair of end plates 22 and 23 axially spaced from each other are fixed on the shaft 21 of the rotor 20. The rotor 20 is provided with six permanent magnets 24. Each of these permanent magnets 24 has a generally square section and extends outwardly in the radial direction of the shaft 21 and axially between the end plates 22 and 23. The rotor 20 has six yokes 25 to hold the permanent magnets 24. Each of the yokes 25 has a generally sector section and the permanent magnets 24 are disposed between each two successive yokes 25. The yoke extends axially between the end plates 22 and 23. Each permanent magnet 24 has different poles N and S at the respective circumferential end faces thereof. Each yoke 25 is made of a magnetic material to form a magnetic path, and the outer circumferential faces of the yokes 25 provide alternately different poles.

Each of the yokes 25 is provided at either outer circumferential corner thereof with a protruding edge extending axially, which prevents the permanent magnet 24 from moving outwardly in the radial direction of the shaft 21.

The shaft 21 is of a circular section and has a keyway 28 formed in the outer circumferential surface thereof. Each of the pair of end plates 22 and 23 has an inner cylindrical face 29, 30 fittable on the shaft 21 and a radial protrusion projecting from the inner cylindrical surface 29, 30 inwardly in the radial direction, which engages in the keyway in the shaft 21. The keyway 28 opens out at one end thereof. Thus, the radial protrusion 31, 32 of the end plate 22, 23 can be inserted into the keyway 28 from the open end thereof. The other end of the keyway 28 is terminated by a flange 33 provided on the shaft 21.

Each of the yokes 25 is provided at either axial end thereof with an axial protrusion 34, 35 extending axially and circumferentially. Each of the end plates 22 and 23 is provided therein with four engagement holes 36, 37 which are engaged on the axial protrusion 34, 35 of each yoke 25 to prevent the yoke 25 from moving circumferentially and radially. The engagement holes 36, 37 run through the end plates 22, 23. Two of the four engagement holes 36, 37 have a circumferential length appropriate for the radial protrusions 34, 35, respectively, while the other two engagement holes have a circumferential length appropriate for both the axial protrusions 34 and 35.

When the above rotor components have been assembled, the radial protrusions 31 and 32 of the end plates 22 and 23 engage in the keyway 28 in the shaft 21 so that the end plates 22 and 23 are securely prevented from rotating about the shaft 21. Also the axial protrusions 34 and 35 of each yoke 25 are engaged in the engagement holes 36 and 37, respectively, in the end plates 22 and 23, thereby securely preventing the yoke 25 from moving circumferentially and radially with respect to the end plates 22 and 23.

Note that for preventing the end plates 22 and 23 from moving axially with respect to the shaft 21, a nut (not shown) screwed on the shaft 21 may be used. However, since the axial load is small, it suffices to bond the end plates 22 and 23 to the shaft 21 using an adhesive agent.

Figure 9:
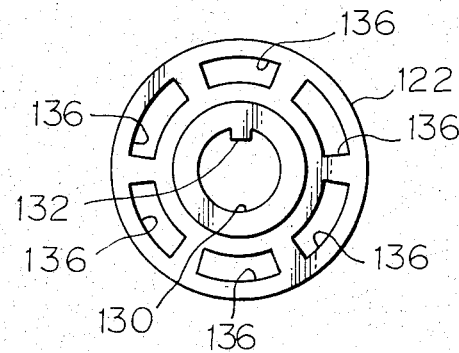
FIG. 9 is an end view showing a variation of the end plate.

FIG. 9 shows an end plate 122 which is alternative to the end plates 22 or 23. This end plate 122 has a inner cylindrical face 130 fitted on the shaft, a radial protrusion 132 projecting from the inner cylindrical face inwardly in the radial direction, and six engagement holes 136 each engaging on the axial protrusion at each end of each of the six yokes.

Two embodiments of the present invention have been described in the foregoing; however, the present invention is not limited to only the above embodiments but can be embodied in various forms without departing from the scope of the present invention as defined by the claims. For example, the engagement holes formed in the end plates and which are engaged on the axial protrusions, respectively, may be hollow and open on the yoke side. Also the number of yokes and permanent magnets used may be selected as appropriate.

CAPABILITY OF EXPLOITATION IN INDUSTRY

As apparent from the foregoing description, the permanent-magnet field rotor according to the present invention comprises a shaft, a pair of end plates fixed on the shaft and axially spaced from each other, a plurality of permanent magnets extending outwardly in the radial direction of the shaft and axially between the end plates, and a plurality of yokes disposed between successive permanent magnets to hold the permanent magnets and extending axially between the end plates, each of the yokes having an axial protrusion at either end thereof, the end plates having formed therein engagement holes engaged on the radial protrusion of each yoke to prevent the yoke from moving circumferentially and radially; therefore, the yokes and end plates can be rigidly fixed without adding to the number of rotor parts. Also the permanent-magnet field rotor of the present invention can be simply assembled for use in a synchronous motor, e.g., AC servo motor.

We claim:

1. A permanent-magnet field rotor, comprising:
   a shaft having a cylindrical outer surface;
   a pair of end plates secured to said cylindrical outer surface of said shaft and axially spaced from each other, each of said end plates having therein engagement holes spaced circumferentially from each other around the axis of said shaft;
   a plurality of permanent magnets arranged circumferentially around the axis of said shaft and axially extending between said end plates to abut at either axial end thereof against said corresponding end plate, each of said permanent magnets having an outer surface and an inner surface in contact with said cylindrical outer surface of said shaft; and
   a yoke disposed between each successive pair of permanent magnets to hold said permanent magnets therebetween, said yokes extending axially between said end plates to abut at either axial end of said yokes against said corresponding end plate, each of said yokes being provided at either axial end thereof with an axial protrusion which, when inserted into said corresponding engagement hole of said corresponding end plate, prevents said yoke from moving circumferentially and radially of said shaft and at either outer circumferential corner thereof with a protruding end which is in contact with said outer surface of said corresponding permanent magnet for preventing said permanent magnet from moving radially.

2. A permanent-magnet field rotor as set forth in claim 1, wherein each of said end plates has an annular inner surface closely fitted to said cylindrical outer surface of said shaft and a radial protrusion extending from said annular inner surface inwardly in the radial direction, and said shaft has a keyway axially extending in said cylindrical outer surface thereof and being open at one end thereof for receiving said radial protrusions of said end plates.

3. A permanent-magnet field rotor as set forth in claim 2, wherein said shaft has a flange formed integrally therewith and extending radially outwardly from said cylindrical outer surface thereof for abutting against one of said end plates fitted onto said shaft.

4. A permanent-magnet field rotor as set forth in claim 1, wherein each of said axial protrusions of said yokes has an outer periphery and an inner periphery which extend circumferentially around the axis of said shaft, and circumferential opposite end sides which extend radially, and wherein said engagement holes of each of said end plates are formed to closely engage with at least one of said successive protrusions circumferentially arranged at either end of said yokes.

5. A permanent-magnet field rotor as set forth in claim 1, wherein each of said permanent magnets has a rectangular cross-section throughout the whole axial length thereof, and each of said yokes has an outer peripheral surface extending circumferentially around the axis of said shaft and circumferential opposite side surfaces which extend radially outward from said cylindrical outer surface of said shaft, each of said side surfaces of said yokes being in close contact with a corresponding side surface of said permanent magnets.

* * * * *